June 28, 1949.　　　C. DE LA SOURCE　　　2,474,726
DRILL HOLDER AND LIKE TOOL
Filed April 9, 1947　　　2 Sheets-Sheet 1
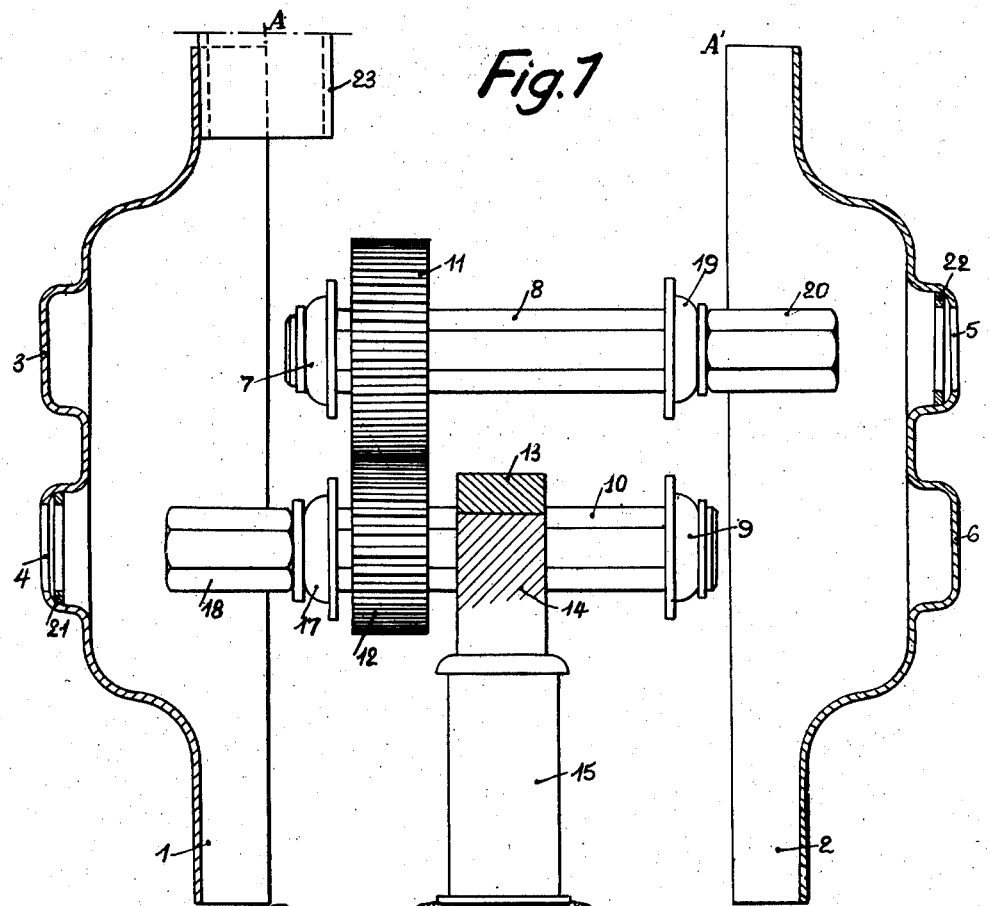
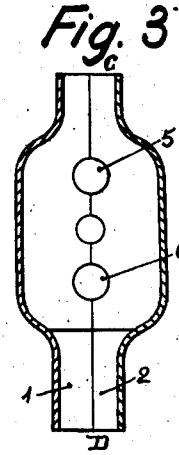 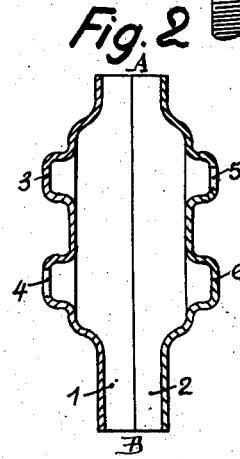 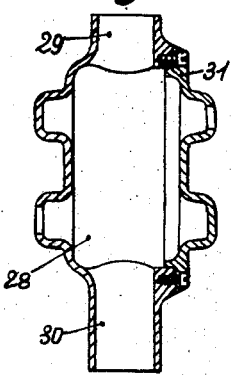 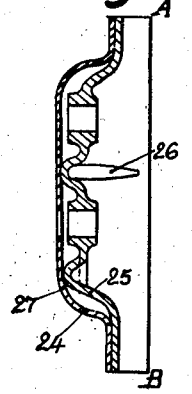
INVENTOR
CHARLES DE LA SOURCE
BY Otto Munk
HIS ATTY June 28, 1949.  C. DE LA SOURCE  2,474,726
DRILL HOLDER AND LIKE TOOL
Filed April 9, 1947  2 Sheets-Sheet 2
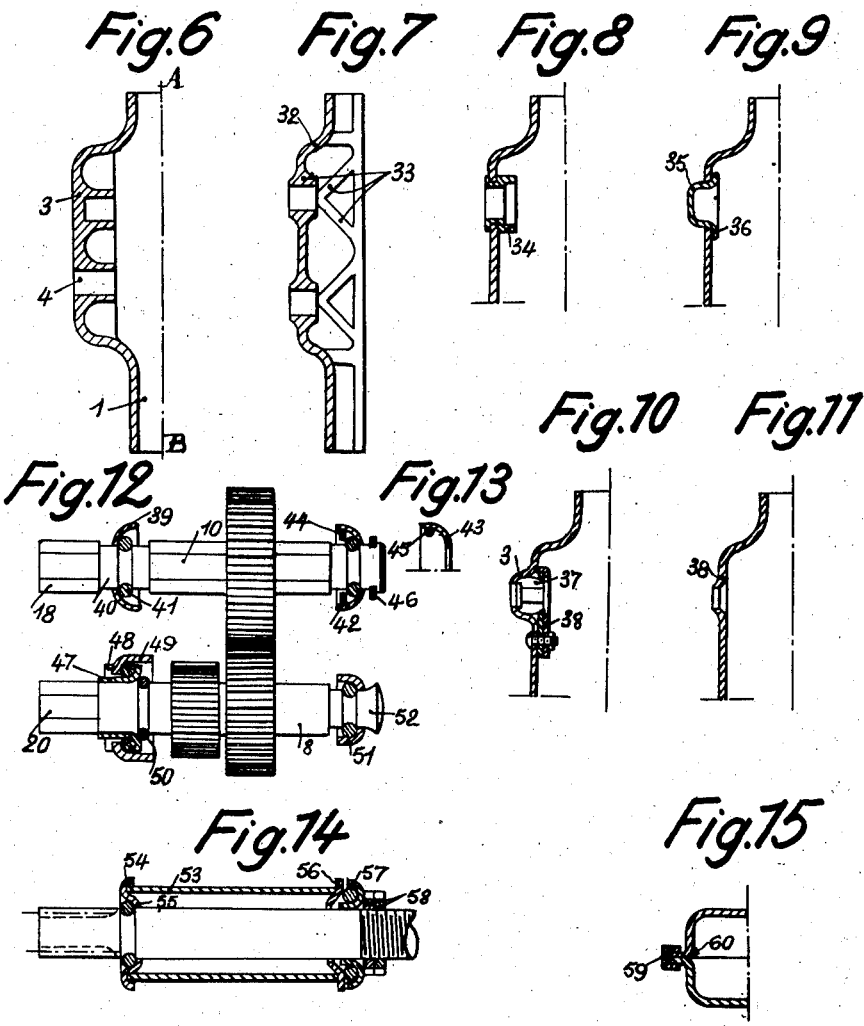
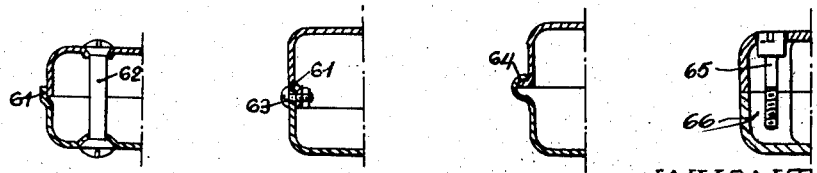
INVENTOR
CHARLES DE LA SOURCE
BY Otto Munk
HIS ATTY

UNITED STATES PATENT OFFICE 2,474,726

DRILL HOLDER AND LIKE TOOL

Charles de la Source, Paris, France, assignor to Societe: Les Fils de Peugeot Freres, Valentigney, France, a French company Application April 9, 1947, Serial No. 740,367
In France May 30, 1945

Section 1, Public Law 690, August 8, 1946
Patent expires May 30, 1965

1 Claim. (Cl. 74—670)

The present invention relates to improvements in the construction of drill-holders and like tool-holders, in which a rotary tool, arranged in the axis of the instrument, is set in motion by the rotation of a lateral hand-crank.

Usually, drill-holders comprise frames which are intended to withstand the stresses and are closed by covers which do not in any way participate in the strength of the assembly.

The invention has for its object to provide a structure such that the whole gear-containing case participates in the bracing of the assembly, thereby enabling the drill-holder to be lightened by making a more efficient use of the material.

For this purpose, the case comprises two shells or hollow cup-shaped bodies, the cross-sectional shape, the flanges, the ribs, the swaged portions and the assembling elements of which contribute to stand the various stresses (bending, twisting, compression) to which the tool-holder may be subjected.

The spindles or other movable members are mounted in ball-bearings so as to increase the efficiency of the transmission and allow a wider range of speeds between the tool spindle and the hand-crank. The tool may have two or three geared up or geared down speeds, thereby providing for more efficient use of the tools with less fatigue for the operator.

The movable elements are so constructed that they form complete small units which can be readily manipulated and mounted, without a machining operation or the use of artificial means for holding all or a part of their component members.

Other characteristics of the invention will become apparent from the ensuing description, taken with reference to the accompanying drawing which shows, by way of example, various embodiments of the invention and in which:

Fig. 1 is a general view on a large scale of a drill-holder or "brace" constructed in accordance with the invention, the two parts of the case being shown spaced apart and separated from the spindles and bearings of the mechanism;

Figs. 2 to 11 show various modifications of construction of the case;

Fig. 12 shows an example of construction of the bearings for the spindles of the mechanism;

Fig. 13 is a partial view of a modification of the device for retaining the balls of a bearing;

Fig. 14 shows another modification of a device of this kind and

Figs. 15 to 19 show various modifications for the assembling of the case.

Referring to Fig. 1, at 1 and 2 have been shown two shells or hollow cup-shaped bodies which are adapted to be assembled together along the junction line AB, A'B' so as to form a rigid case. Said shells are provided with hollow bosses 3, 4, 5, 6 which are intended to increase the rigidity of the case. Furthermore, the bosses 3 and 6, which have a continuous bottom, are intended to accommodate one of the bearings 7 of a spindle 8 of the mechanism and one of the bearings 9 of another spindle 10 of said mechanism, said spindles supporting intermeshing pinions 11 and 12 and the spindle 10 furthermore supporting a worm wheel 13 meshing with a worm 14 secured to the spindle 15 carrying the chuck (not shown) in which the tool is clamped.

The boss 4 with a perforated bottom accommodates the other bearing 17 of the spindle 10 and allows a polygonal shank 18 to pass, on which can be fixed the crank-handle for driving the tool. Similarly, the boss 5 with a perforated bottom accommodates the other bearing 19 of the spindle 8 and allows a second similar polygonal shank 20 to pass.

At 21 and 22 have been shown the joints which are intended to prevent leakages of lubricant and the ingress of dust and at 23 has been shown a reinforcing bushing intended to consolidate the assembly of the two shells 1 and 2.

If the driving crank is attached to the shank 18, the tool is driven with a direct drive; if it is attached to shank 20, it is driven at a higher speed ratio (owing to the gear train 11, 12).

Moreover, as will be seen in Fig. 12, the shanks 18, 20 may be located on the same side of the case, provided that the crank is suitably bent.

The shells 1 and 2, which may be made of cast or stamped metal or of moulded plastic material, are assembled together along the plane of the joint AB, A'B' which is specifically identified in Figure 1, is shown as AB in Figures 2, 4 and 6, and as CD in Figure 3, and is otherwise illustrated although not specifically designated in Figures 7 to 11. This plane, as shown in these figures, is a plane of symmetry for the assembled shells, contains the axis of symmetry of the resultant case and the coaxial axis of rotation of the tool-rotating spindle 15 (Figure 1). This method of assembly permits the release or assembly of all the internal members of the case by simply moving said shells away from or towards one another. The case of Fig. 1 has been shown alone, diagrammatically in Fig. 2.

In Fig. 3, the joint plane CD is shown at right angle to that shown in Figure 1, for instance, so that the axes of the bearings 5, 6, pass through said joint plane CD. Plane CD preserves the characteristics of symmetry and advantages described in the preceding paragraph.

In Fig. 4, the shells of the case are each formed by two parts 24, 25 rigidly fixed to one another by riveting, welding or embedding parts lodged in the body of one of the shells. The whole arrangement forms a light assembly which is made very rigid by the spacing apart of the elements 24, 25 forming partitioned compartments which are not readily deformable by twisting and bending, owing to the increase of the moments of inertia and of the strength of all the parts of the assembly.

Ribs, such as the one shown at 26 and reinforcing beadings such as 27 form bearing, fixing or fastening points for the elements 24, 25 and furthermore serve to absorb the cutting and shearing stresses.

Figs. 5 and 6 show cases made of moulded material. In Fig. 5, the case is asymmetrical and comprises a main shell 28 provided with the bores 29 and 30 accommodating the tool support and the spindle of the chuck and a lateral portion 31 which is screwed on the side of the shell 28. However, as is apparent from the drawing, Figure 5, the asymmetry relates merely to the shape of the main shell 28 with respect to the lateral cover portion 31; but the assembly of the main shell 28 and cover 31 forms, as shown in this figure, a case which on the whole preserves the features of symmetry with respect to the axis of rotation of the tool-rotating spindle. In Fig. 6, the arrangement is symmetrical, with a medial joint plane AB.

Fig. 7 shows a case comprising a very thin stamped metal plate 32 in which moulded material 33 is applied at intervals in order to impart to this case the requisite strength. Maximum lightness is thus obtained, since the material can be distributed in accordance with the distribution of the stresses, and the thickness of the case is not limited by questions of ease of moulding and fragility.

The moulded material may also be replaced by ribs and bosses of thin stamped and welded sheet metal, when the materials used are suitable for this purpose. It is possible to rivet the ribs in the case of non-weldable metals or of plastic materials.

The housings for the movable elements need not be integral with the shells but may be secured thereto according to constructional facilities.

Figs. 8 to 11 show various constructions of housings for the bearings or bushings.

In Fig. 8, a bushing 34, performing the function of the boss 4, is set in the wall of the case. In Fig. 9, a stamped cap 35, performing the function of the boss 5, merely bears by means of a flange 36 against the inner wall of the case and is held in position after assembling by one of the spindles of the mechanism.

In Fig. 10, the boss 3 accommodates a perforated ball 37 which is retained by a riveted or bolted strap 38 and which acts as a bearing for the spindle, the ball enabling the bearing to be correctly aligned.

In Fig. 11, the boss 3 is reduced to a slight flange 38 which is formed when punching in the case the hole receiving the spindle. As a result of the symmetrical construction of the gear and spindle-containing case embodied in the tool-holder object of the invention and maximum rigidity thereof, the said case participates integrally and to the maximum degree in resisting the various stresses, such as bending, twisting, compression, to which the tool-holder may be subjected during use.

According to another characteristic of the invention, the bearings 7, 9, 17, 19 for the spindles of the mechanism are so constructed that the ball-cages cannot be removed from the shaft without a special operation which cannot occur in an untimely manner during the manipulations for mounting or for separating the assembly.

In the example of Fig. 12, the cage 39 of one of the bearings is forced onto the polygonal shank 18 and falls into a recess 40 cut in the spindle 10, of such dimensions that it allows the cage to rotate loosely on the balls 41 and does not allow a sufficient backward movement of said cage 39 to release the balls, so that said balls always remain confined in their housing.

The cage 42 of Fig. 12 and the cage 43 of Fig. 13 are respectively held in position by a washer 44 forced into the cage and by a round or square keeper or spring 45 housed in a groove of said cage.

Another safety device is represented by a spring 46 pressed in a groove at the end of the spindle 10. Said spring may be replaced by a washer which is pressed into its groove like the centering bands of projectiles.

As shown at the lower part of Fig. 12 the balls are arranged on a centering member 47 supporting a retaining washer 48 which holds the cage 49 in position. The whole arrangement is held on the spindle 8 by a spring 50 which is pressed in a groove of the spindle and ensures the correct axial position of the bearing. The cage 51 of the bearing at the other end of the spindle 8 is held in position by a splayed portion 52 which prevents the cage 51 from becoming disengaged.

Fig. 14 shows an arrangement in which a tubular distance-piece 53 bears in a groove 54 of one of the cages 55, and against a back-plate 56 confining the balls in the cage 57, so as to hold the cages a fixed distance apart and center them on the same axis. Nuts 58 serve to adjust the play of the balls so as to allow free rotation with practically no play.

This arrangement is particularly suitable for mounting the spindle 15 of the chuck accommodating the tool. In this case, the cage 57 and the back-plate 56 absorb the dust produced by the penetration of the tools (drill, milling-cutter and the like) and the cage 55 holds the shaft when a tool is put to work and enables it to be withdrawn, while rotating, if necessary.

Fig. 1 shows that the spindles 8, 10, 15 together with the elements secured thereto can be mounted in one of the shells 1 and that the other shell 2 can then be mounted so that it encloses the whole arrangement and determines its position.

Assembling may be effected by means of screws, hoops, interengagement, keeper, rivets, welding, and so forth. If it is desired to have an assembly which can be taken apart or not, use should be made of one of the four first means or a combination of these means, or on the contrary rivets or welds, or both of these means concurrently can be used.

This latter solution may be advantageous for preventing the ingress of dust or foreign bodies.

It is also possible to contemplate assembling the case by crimping in order to provide a fluid-tight assembly and joints such as 21—22 and 16, shown in Figure 1, may be fitted in the holes through which the shafts pass.

Fig. 15 shows a fluid-tight closure by means of a keeper 59 and a joint 60 which can be eliminated in certain cases.

Figs. 16 and 17 show closures by means of a joggle 61 and screws 62 or 63.

In Fig. 18, the edge 64 of one of the shells is turned down over the other and thus forms a rugged assembly.

Finally, Fig. 19 shows a closure by means of screws 65 passing through a boss 66 in the alternative of a moulded case (such as that of Fig. 6).

This invention is not limited to the details of construction hereinbefore described, which have only been given by way of example.

Thus, the various methods of assembling the device object of the invention obviously depend on the external shapes and the above examples can be modified geometrically, according to the possibilities of moulding and spacing, the room available and the beauty of the article.

Having now described my invention what I claim as new and desire to secure by Letters Patent is:

A portable hand-driven rotary-tool holder comprising two hollow cup-shaped shells forming, when assembled, a rigid and totally enclosed stress-resisting casing, parallel transverse spindles and pinions mounted thereon and a tool-rotating spindle geared to said transverse spindles and pinions, said transverse spindles, pinions and tool-rotating spindle being substantially contained in said casing, said cup-shaped shells having their walls symmetrical with respect to the axis of rotation of said tool-rotating spindle, and being joined together in a plane containing the axis of rotation of said tool-rotating spindle, each of said cup-shaped shells having two reinforcing hollow bosses to increase the rigidity of said casing, each of said transverse spindles extending between two of said bosses, each of said transverse spindles having at one of its ends a bearing located in one of said bosses, and at the other one of its ends a crank handle-receiving shank extending through the other opposite boss.

CHARLES DE LA SOURCE.

REFERENCES CITED

The following references are of record in the file of this patent:

FOREIGN PATENTS

| Number | Country | Date |
|---|---|---|
| 499,841 | France | Nov. 29, 1919 |
| 766,759 | France | Apr. 23, 1934 |